Patented Aug. 26, 1952

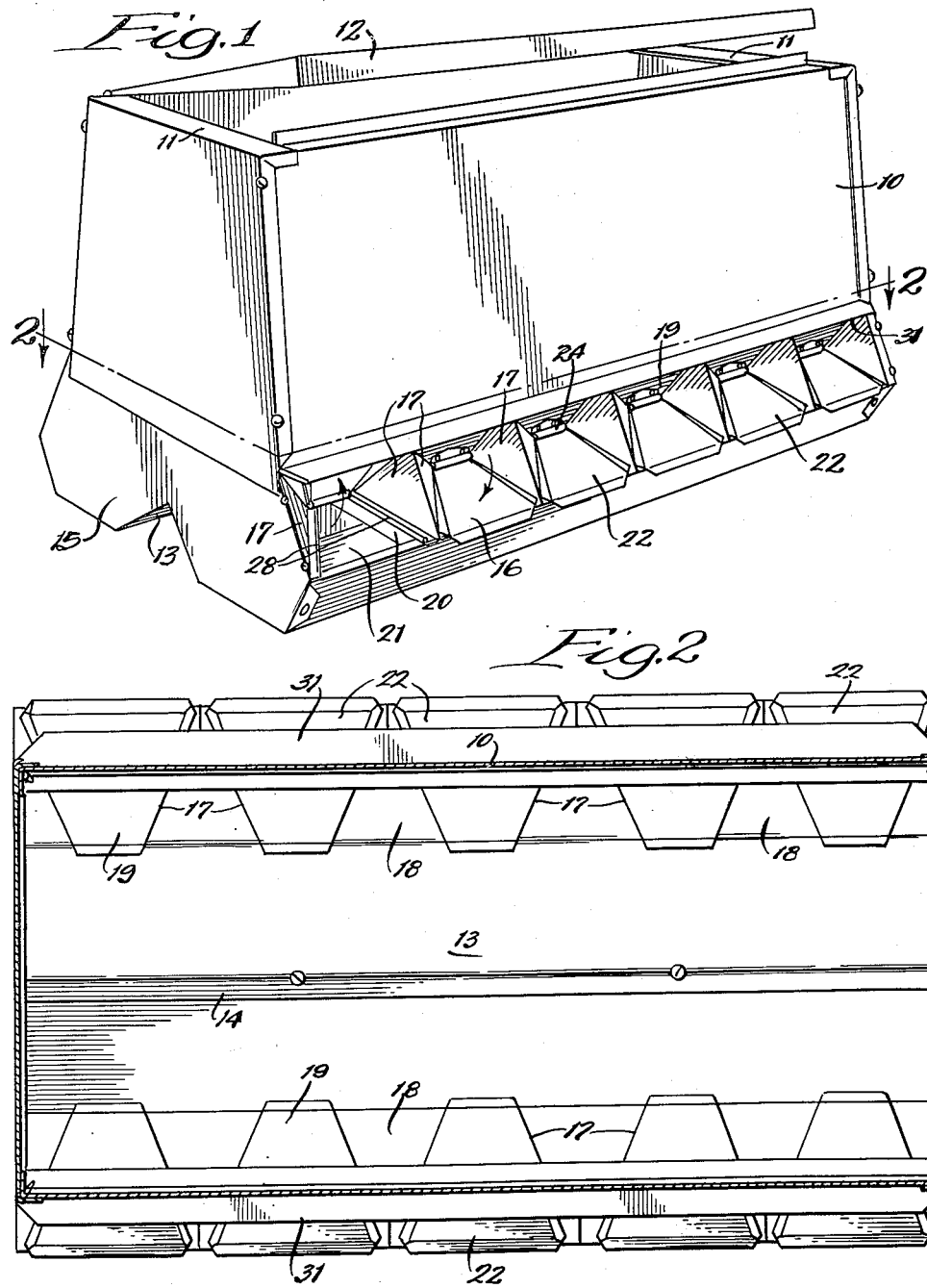

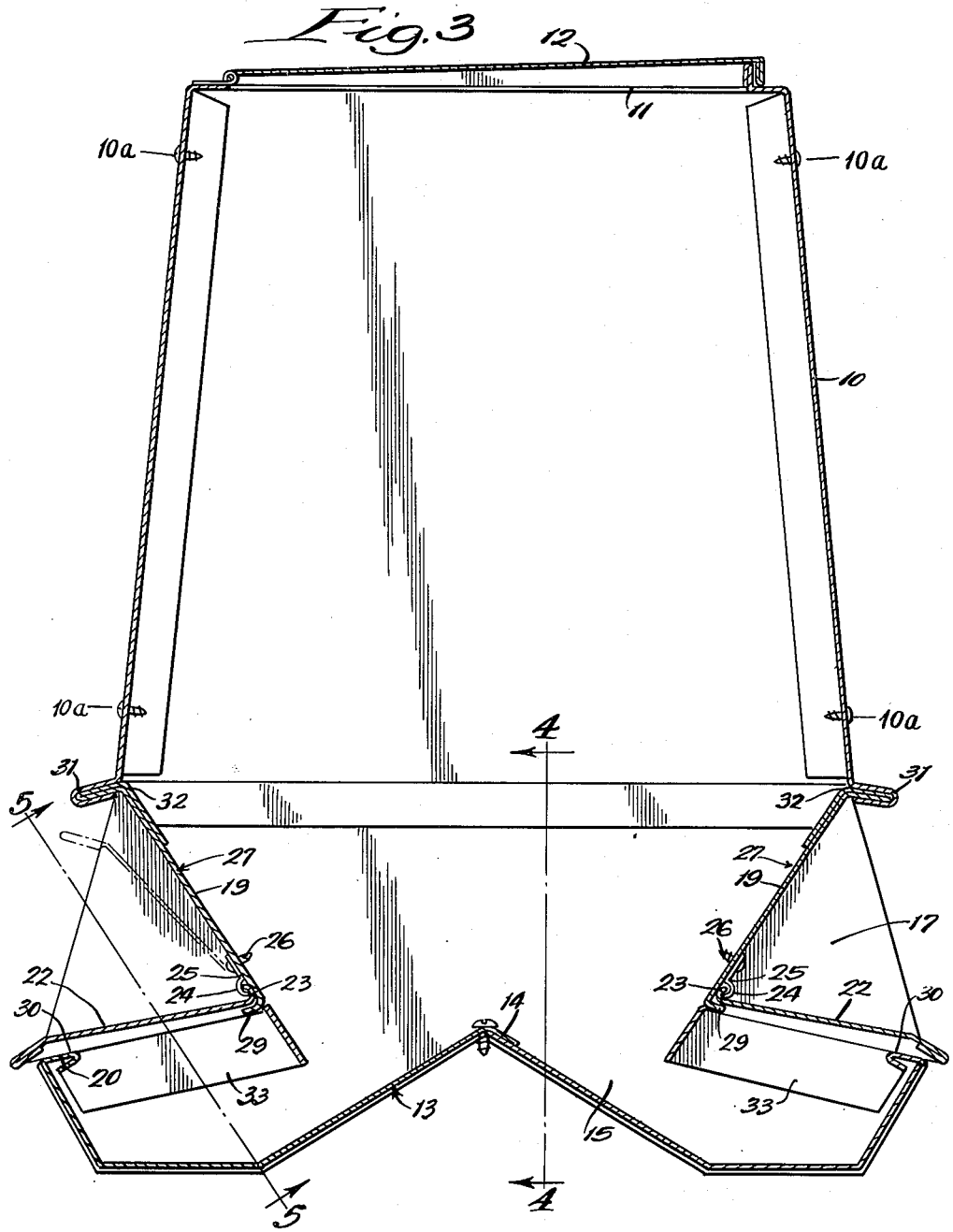

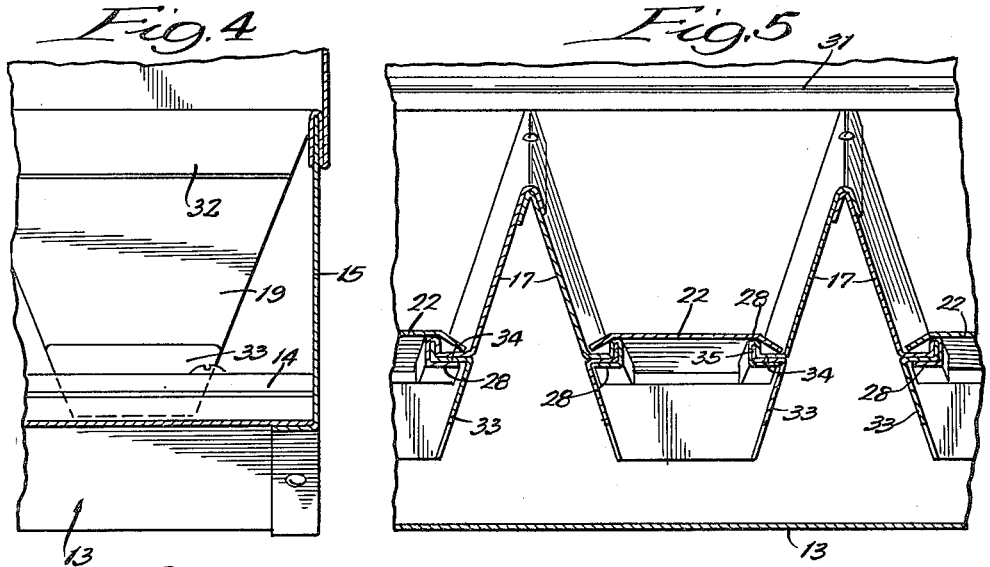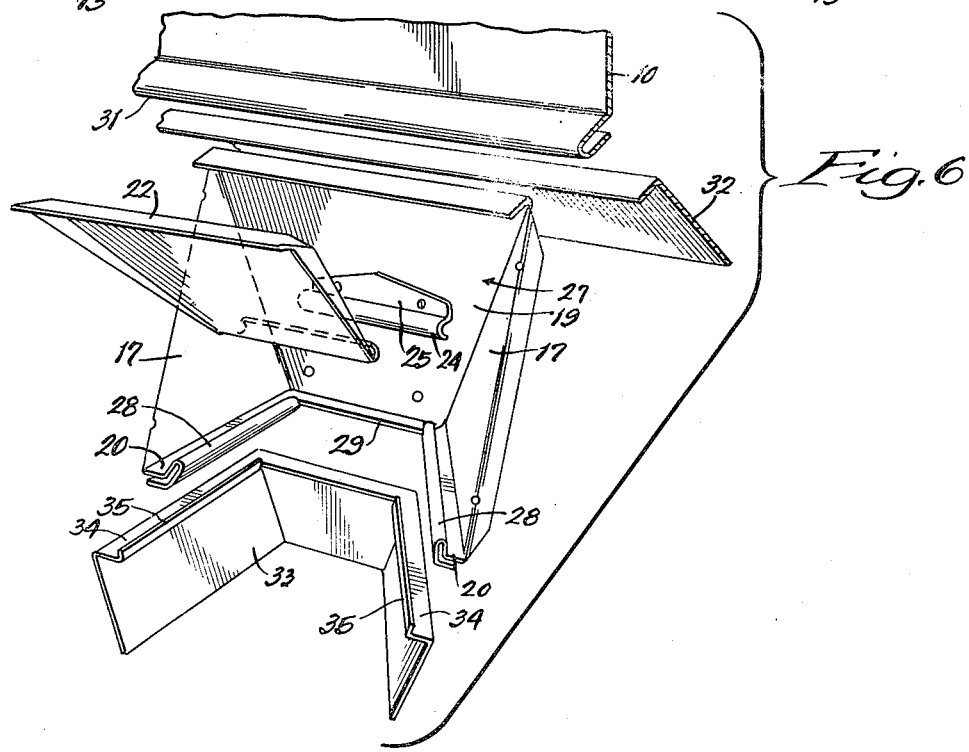

2,608,179

UNITED STATES PATENT OFFICE 2,608,179

FEEDER STRUCTURE

Charles H. Otto, Cedar Rapids, Iowa

Application January 24, 1950, Serial No. 140,305

6 Claims. (Cl. 119—52)

This invention relates to a feeder structure and more particularly to a hopper and feed trough for the feeding of animals, such as hogs, etc.

The chief difficulty with feeder devices in which hoppers are filled with grain and in which a feed trough or feed openings are provided is that the hopper becomes clogged and it is necessary for someone to make frequent visits to the hoppers to shake down the material therein. At times, such visits are overlooked and the animals remain without feed even though the hopper is partially filled.

In other feeder structures, there is a tendency for the grain to spill out at the feed openings and onto the ground where a wastage occurs. There has long been a need for a feed hopper structure which will permit the flow of grain constantly to the feed openings while at the same time preventing spillage, etc.

An object of the present invention is to provide a feed hopper structure which is substantially non-clogging and which feeds grain constantly to the trough or feed openings without causing the feed to spill out. Yet another object is to provide a feeder structure which does not require adjustment or require the moving of the feed therein while at the same time feeding the grain, etc. constantly to the feed openings and without overflow of the feed. Other specific objects and advantages will appear as the specification proceeds.

The invention is shown in an illustrated embodiment, by the accompanying drawings, in which—

Fig. 1 is a perspective view of a feeder structure embodying my invention; Fig. 2, an enlarged transverse sectional view, the section being taken as illustrated at line 2—2 of Fig. 1; Fig. 3, an enlarged vertical sectional view; Fig. 4, a broken detailed sectional view, the section being taken as indicated at line 4—4 of Fig. 3; Fig. 5, a broken detail sectional view, the section being taken as indicated at line 5—5 of Fig. 3; and Fig. 6, an exploded view showing the parts that are united in the forming of the feed well and closure.

In the illustration given, 10 designates an upper casing which may be formed of a single casing structure or by casing sheets secured together by screws 10a, etc. The top of the casing is provided with an opening 11 for the introduction of feed, and I provide a hinged closure 12 for this opening.

The lower part of the casing is provided with a bottom 13, as shown more clearly in Fig. 3, the bottom being provided with an upwardly-pitched central portion 14 so as to direct feed toward the sides of the hopper provided by the casing. End walls 15 are secured to the bottom wall 13 to close the lower portion of the hopper at the ends, as illustrated best in Fig. 1.

Between the bottom wall 13 of the hopper and the upper casing portion 10, I provide inwardly-extending feed wells or recesses 16, which will now be described, along the lower portions of the casing side walls. The terms feed wells or wells and recesses are herein used interchangeably and refer to the same parts 16. Since the problem of supplying feed automatically to the wells or recesses 16 and to the feed openings in the lower portion thereof, while at the same time preventing spillage of the material fed, is of great importance, the well structure should be set out in some detail. In general, I have provided a well structure in which there are vertical channels for the flow of grain downwardly in a straight path between the wells toward the space underneath the wells, and the grain is thus fed laterally under the wells so that the grain kernels meet below the feed openings in the well. By this means, clogging of the structure is prevented while at the same time spillage is avoided.

As shown more clearly in Figs. 1, 2 and 5, I have provided a number of feed wells or recesses 16 along the lower portions of the casing side walls, each having side walls 17 which are inclined inwardly. Each two adjacent side walls 17 form therebetween and within the hopper a V-shaped channel 18, as shown best in Fig. 2. It is this channel 18, which is V-shaped in cross section, that provides for the direct flow of feed or grain downwardly and without obstruction into the area below each well 16. Further, it is the channel 18 which enables the grain to flow laterally under each of the wells so as to supply grain therebelow.

In the forming of each well I also provide a downwardly and inwardly-inclined wall 19. To form the feed opening, I provide a perimetric edge or flange 20 which is inclined upwardly and tapers inwardly, as illustrated best in Figs. 1 and 6. The perimetric flange 20 encloses the feed opening 21 which normally is closed by a closure plate 22. The closure plate is provided at its rear with an upwardly and inwardly extending hinge member 23 that engages a downwardly and inwardly hinged flange 24 carried by the bracket member 25. In the illustration given, the bracket member 25 is secured to the wall 19 by screws 26.

In the finished well structure, it will be noted that all of the walls, including the closure plate 22, taper inwardly toward each other to provide a well or recess which narrows at its inner end and that the lower flange structure provides an angular space closed by a plate 22 which is generally in the shape of a trapezoid.

While the structure described may be formed in any desired manner by the union of casing sheets, I have shown in Figs. 5 and 6 a detailed arrangement which has been found satisfactory. I have formed of a single piece 27 the downwardly and inwardly-inclined wall 19 and the oppositely disposed side wall 17, as shown best in Fig. 6. The lower portions of the side walls 17 are turned inwardly to form the flanges 20, and preferably the inner ends of the flanges are turned upwardly at 28 to prevent the seepage of water, etc. into the hopper. The lower end of wall 19 is turned inwardly to form an inner flange 29. The outer edge or flange 30 is provided by the bottom wall 13, as shown in Fig. 3. Thus the edge or flange portions 28, 29 and 30 together make up the composite or perimetric flange 20 defining the feed opening and providing an edge extending thereabout.

As shown best in Figs. 3 and 6, the upper casing 10 is provided at its lower edge with a hook portion 31 which receives the upper outwardly-turned end of the wall 19. The outwardly-turned end of the wall 19 is reenforced by the angle strip 32.

A skirt 33 is provided with side flanges 34 having an upwardly-turned edge 35. The flanges 34 and 35 are interlocked with the flange structure 28, as shown more clearly in Fig. 5, and the skirt thus supported extends downwardly below the edges or flanges 28 as well as the edges or flanges 29 and 30. Any of the above parts may be made in several pieces, or integrally, as desired.

In the exploded view shown in Fig. 6, the bracket 25 is shown at a spaced distance above the openings through which the screw 26 extends in connecting the bracket at a point just above the flange 29.

*Operation*

In the operation of the structure, the hopper closure 12 is raised and the hopper is filled with grain or feed. The upwardly-pitched portion 14 of the bottom wall tends to direct the grain generally toward the feed openings. The V-shaped vertical channels 18 between the wells provide direct passages by which the feed passes downwardly and into the spaces about the side walls 17. The grain thus feeds laterally under the closure 22 so that the streams of grain tend to cushion each other by contact under the feed openings. By reason of this lateral feeding of grain under each feed well, there is less thrust toward the outer edge of the well where the grain might tend to spill. Further, there is no tendency for the hopper to clog in the feeding of the material to the feed openings because of the direct vertical channels and because they direct the feed material laterally under the openings.

The hog raises the closure 22 by engaging the outer lip of the closure with his snout and feeds through the opening 21. He is prevented from biting the hog feeding in the adjacent trough by the side walls 17. When the hog leaves the feed well, the closure 22 swings to closed position and, as indicated more clearly in Figs. 5 and 6, the closure and the flange structure therebelow provide a complete waterproof closure about the feed openings so that rain and drifting snow are not able to enter the feed hopper.

It will be understood that the feed hopper may be made with a single well opening or it may be made with a series of well openings arranged only on one side or on both sides. Further the details of structure may be changed widely, depending upon convenience and economy in materials, etc.

With the structure shown, it is found that there is no tendency of the feed material to spill out of the hopper while at the same time the vertical channels 18, which may be of any desired cross section, feed the material downwardly and then laterally under the feed or trough openings so that no clogging at any time occurs and feed is always provided under the openings as long as there is feed in the hopper.

While in the foregoing specification I have described the structure in considerable detail for the purpose of illustrating an embodiment of the invention, it will be understood that such details of structure may be varied widely by those skilled in the art without departing from the spirit of my invention.

I claim:

1. In a feeder structure, a casing providing a hopper and having the lower portion of a side wall thereof provided with a series of inwardly-inclined walls providing recesses extending into the hopper, said casing also providing a feed opening in the lower portion of each of said recesses, a skirt shield depending from each of said inclined walls about each of said feed openings and extending below the edges thereof, and closure plates hingedly closing said openings, said inclined wall portions between said recesses providing within the hopper inwardly-extending and open-topped vertical channels between the recesses for feeding material downwardly and laterally below the recesses.

2. In a feeder structure, a casing providing a hopper and having a lower side wall portion provided at intervals with inwardly-inclined wall portions forming recesses extending into the hopper, said casing also providing a feed opening in the lower portion of each of said recesses, hingedly-mounted closure plates for said openings, said inclined wall portions providing between adjacent wall portions and within the hopper inwardly-extending and open-topped vertical channels between the recesses, and a depending skirt extending about each of said openings and projecting below the edges thereof.

3. In a feeder structure, a casing providing a hopper and having a lower side wall portion provided at intervals with inwardly-inclined wall portions forming recesses extending into the hopper, said casing also providing a feed opening in the lower portion of each of said recesses, hingedly-connected closure plates for said openings, said inclined wall portions between said recesses providing within the hopper inwardly-extending V-shaped and open-topped vertical channels between the recesses, and a depending skirt extending about each of said feed openings and also extending below said feed openings.

4. In a feeder structure, a casing providing a hopper and having the lower portion of a side wall thereof provided at intervals with inwardly-inclined wall portions forming recesses extending into the hopper, said casing also providing a feed opening in the lower portion of each of said recesses, closure plates for said openings hinged to said inclined wall portions, and a bottom wall for said hopper provided with a central ridge running longitudinally of the hopper, said inclined wall portions between said recesses providing within the hopper inwardly-extending and open-topped vertical channels between the recesses, said first-mentioned wall being provided with a skirt extension depending downwardly therefrom and enclosing the rear and side edges of each of said feed openings to prevent the overflow of feed from said feed openings.

5. In a feeder structure, a casing having side walls and end walls providing a hopper and being equipped near its top with an inlet opening and at its bottom having inwardly-inclined wall portions in spaced relation forming feed recesses extending into the hopper at a spaced distance from the bottom of the hopper, said casing providing a feed opening in the lower portion of each of said recesses, hingedly-mounted closure plates for said openings and depending skirts extending below said feed openings but spaced from the bottom of said hopper, and side wall portions between said recesses being inclined inwardly to provide within the hopper inwardly-extending and open-topped vertical channels between the recesses.

6. In a feeder structure, a casing providing a hopper having a flared lower portion provided with a bottom, said lower portion of the hopper being provided at intervals along at least one side wall thereof with inwardly-inclined wall portions forming feed recesses extending into the hopper, said casing providing also a feed opening in the lower portion of each of said recesses, said recesses being tilted downwardly and outwardly, hingedly-mounted closure plates for said openings, said inclined wall portions between said recesses providing within the hopper inwardly-extending and open-topped vertical channels for the feeding of material laterally below said closure plates, and a depending skirt extending about each of said openings and projecting below the edges thereof.

CHARLES H. OTTO.

REFERENCES CITED

The following references are of record in the file of this patent:

UNITED STATES PATENTS

| Number | Name | Date |
| --- | --- | --- |
| 1,333,787 | Winters | Mar. 16, 1920 |
| 1,629,979 | Steinback | May 24, 1927 |
| 1,843,459 | Niehage | Feb. 2, 1932 |
| 1,910,596 | Einsel et al. | May 23, 1933 |
| 2,507,264 | Otto | May 9, 1950 |
| 2,522,635 | Pittenger et al. | Sept. 19, 1950 |